March 27, 1945.   V. W. SHERMAN ET AL   2,372,453
ELECTRIC MACHINE
Original Filed March 2, 1942   2 Sheets-Sheet 1

INVENTORS
VERNON W. SHERMAN
AND EUGENE GONYOU
BY Harness, Dick, Patty & Harris
ATTORNEYS.

March 27, 1945. V. W. SHERMAN ET AL 2,372,453
ELECTRIC MACHINE
Original Filed March 2, 1942  2 Sheets-Sheet 2

INVENTORS
VERNON W. SHERMAN
AND EUGENE GONYOU
BY
ATTORNEYS.

Patented Mar. 27, 1945

2,372,453

UNITED STATES PATENT OFFICE 2,372,453

ELECTRIC MACHINE

Vernon W. Sherman, Summit, N. J., and Eugene Gonyou, Detroit, Mich., assignors to Chrysler Corporation, Highland Park, Mich., a corporation of Delaware Continuation of application Serial No. 432,938, March 2, 1942. This application March 31, 1944, Serial No. 528,920

18 Claims. (Cl. 171—252)

This application is a continuation of Sherman et al. application Serial No. 432,938, filed March 2, 1942.

This invention relates to alternating current, dynamo-electric machines.

The need for a high output dynamo-electric machine for installation on mobile units, such as aircraft, has long existed. Efforts to provide a satisfactory machine have not been entirely successful, mainly because of the excessive weight. In many constructions heretofore known, it has been satisfactory to mount a dynamo-electric machine from both ends or along the sides by means of a surrounding casing. Thus no real problem was encountered as to support, but the limitations as to weight and space imposed by aircraft requirements make necessary or desirable the supporting from one end.

In the present instance, a design and construction has been evolved in which the electrical losses have been reduced, the cooling has been improved and the mechanical construction of the generator has been materially simplified.

It is accordingly the general object of this invention to provide an improved dynamo-electric machine having the aforesaid characteristics.

Another object is to provide a dynamo-electric machine that may conveniently be supported from one end.

A further object is to improve the association of laminations, bars, and end rings of a dynamo-electric machine so that supporting of the machine is simplified.

Still another object is to provide a dynamo-electric machine that may be supported independently of a surrounding casing.

Other objects and advantages will be apparent from the following description which with the accompanying drawings, constitutes a disclosure of a preferred form of our invention.

In the drawings where reference numerals are used to designate corresponding parts referred to in the description, Fig. 1 is a longitudinal sectional view of the generator;

Figure 1:
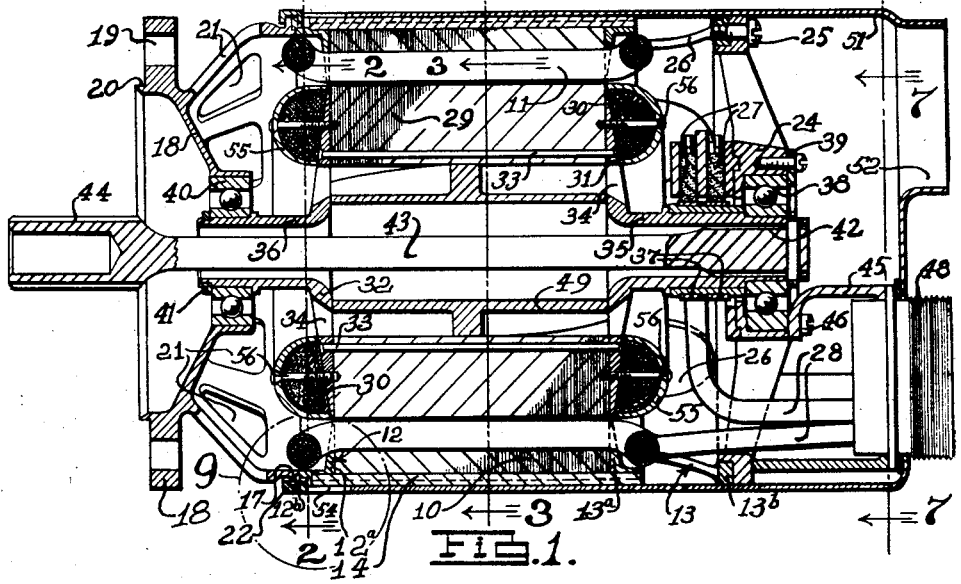

The stator assembly of the machine comprises laminations 10 which are assembled into a stack in accordance with usual practice. The stack carries a winding 11 and is retained in assembled relation by end rings 12, 13 and T-bars 14. The end ring 12 has a portion 12ª abutting the laminations 10 and a flange 12ᵇ displaced from the portion 12ª in a longitudinal direction with respect to the stack of laminations 10 and extending radially outwardly farther than the portion 12ª. The end ring 13 has a portion 13ª abutting the laminations 10 and another portion 13ᵇ displaced from the portion 13ª in a longitudinal direction and extending radially outwardly farther than the portion 13ª.

Figure 3:
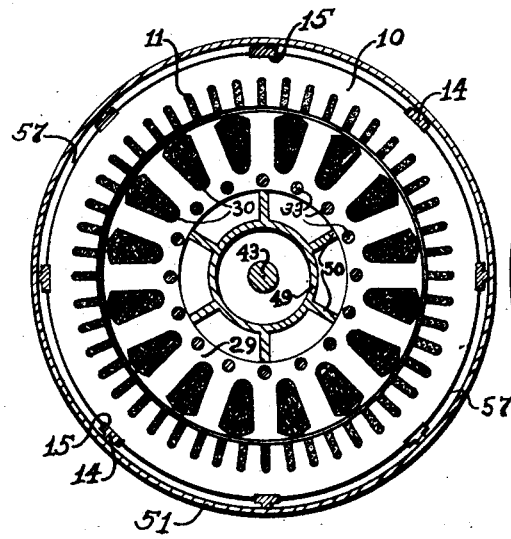
Fig. 3 is a sectional view along line 3—3 of Fig. 1 looking in the direction of the arrows.
Figure 5:
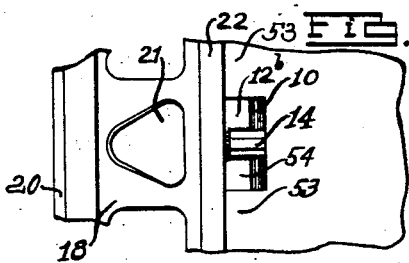
Fig. 5 is a detail of one end of the machine.
Figure 6:
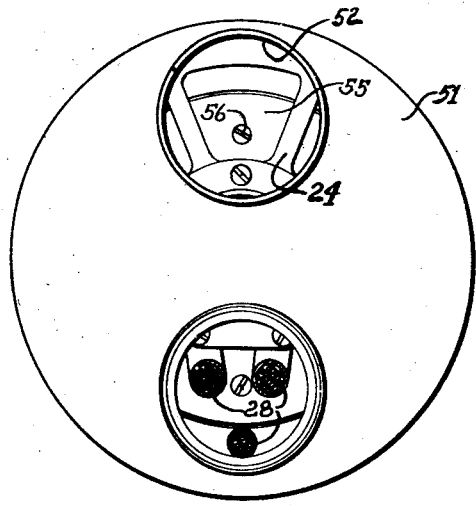
Fig. 6 is an end elevation of the generator from the right side of Fig. 1.

As can be clearly seen from Figs. 3 and 5, the bars 14 are of T-shape cross-section, and slots 15 are provided at spaced intervals in the stack for accommodating the base portions thereof. The upright portions of the T-bars thus extend radially from the outer periphery of the stack. Besides providing maximum strength for their cross section, the T-bars perform another important function which will be referred to later.

Figure 9:
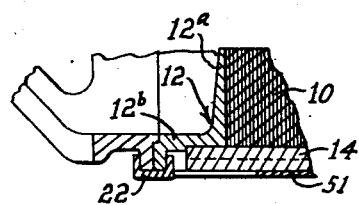
Fig. 9 is an enlarged sectional view of the parts within the circle 9 in Fig. 1.

The T-bars 14 are welded to the portions 12ª and 13ª of the end rings 12 and 13 (Figs. 5 and 9). Thus the laminations 10 are rigidly held against both longitudinal and circumferential displacement. The ends of the T-bars 14 expand upon the heating incident to the welding and contract upon cooling after welding. This contraction causes the laminations 10 to be gripped very tightly between end rings 12, and so the laminations, bars, and end rings are better enabled to constitute their own supporting structure as will be more fully explained. The flange 12ᵇ of the end ring 12 abuts a mating flange 17 of a main support member 18. The latter is provided with bolt holes 19 and a flange 20 to facilitate securement of the machine to an engine housing or other support. Ventilating holes 21 are also provided as illustrated.

Figure 2:
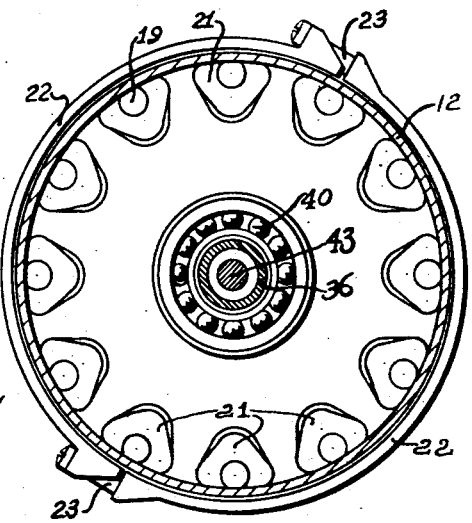
Fig. 2 is a sectional view along line 2—2 of Fig. 1 looking in the direction indicated by the arrows.

The end ring 12 is fastened to the main support member 18 by means of a clamping ring 22 which consists of two halves adapted to be secured together by cap screws 23 as shown in Fig. 2. The ring 22 is of channel shape as shown in Fig. 1, and fits tightly over the flanges 12b, 17 when the screws 23 are tightened.

The right hand end of the generator is provided with an end bell 24 which is fastened to the portion 13b of the end ring 13 by cap screws 25. The end ring 13 is provided between the portions 13a and 13b with an elongated cylindrical portion provided with spaced openings 26. The space between the annular portion of the ring 13 and the bell 24 accommodates the ends of the windings and provides space for the brushes 27 and the leads 28. The holes 26 permit ventilation and accommodate the end turns of the stator winding.

The rotor comprises laminations 29 which are suitably slotted for receiving a winding 30. The laminations are retained in stacked relation by the end rings 31, 32, bolts 33 passing through the stack and end rings at spaced points adjacent the hub as illustrated. The end rings 31, 32 are provided with spaced ventilating openings 34 and have substantially similar cylindrical extensions, designated 35 and 36 respectively, which form mounting hubs for the rotor structure.

The hub portion 35 is longer than 36 for accommodating the slip rings 37. An anti-friction bearing 38 mounts the end portion thereof in the end bell 24, a retaining ring 39 securing the same against displacement. A similar bearing 40 mounts the hub portion 36 in the main support member 18, a split ring 41 retaining the bearing in place.

The hub portion 35 is internally splined for receiving the splined end 42 of a drive shaft 43 which is splined at its other end at 44 for connection to a driving means.

Figure 7:
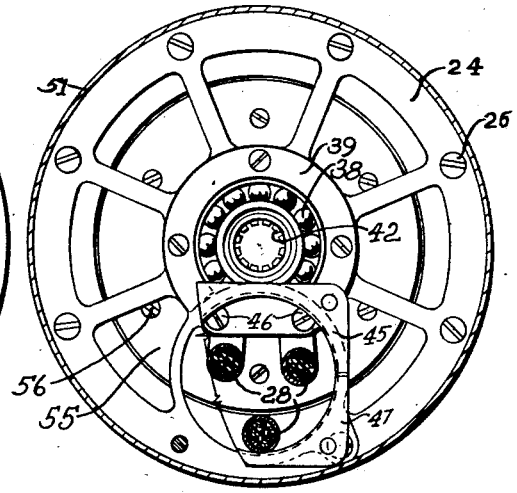
Fig. 7 is a sectional view on line 7—7 of Fig. 1, some parts being shown in elevation for clearness.
Figure 8:
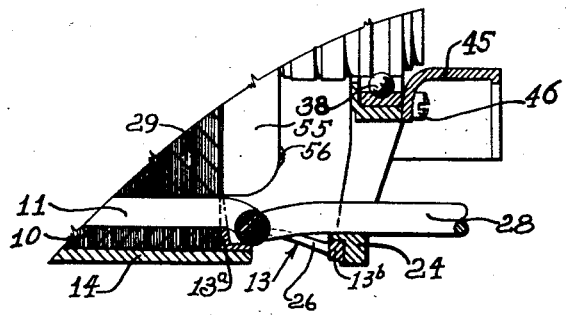
Fig. 8 is a detail of one end with some of the parts removed.

The end bell 24 carries a boss 45 which is fastened to the bell by cap screws 46. The boss is preferably split, as illustrated in Figs. 7 and 8, the lower half 47 being removable to facilitate servicing. A screw threaded connector 48 is suitably secured in the boss 45 and is adapted to connect with the shielded wiring conduit. The boss 45 and connector 48 accommodate the leads 28.

Figure 4:
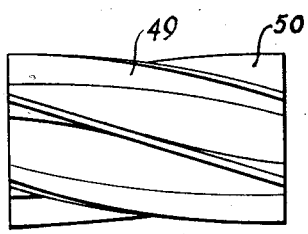
Fig. 4 is a detail of the cooling air impeller.

The rotor also carries an air impeller 49 illustrated in Fig. 4. This impeller has spiral blades 50 and is identical in length with the rotor stack such that it abuts the end rings 31, 32 as shown in Fig. 1. This impeller cooperates with an outer housing 51 to provide an extremely efficient cooling means.

A housing 51 is provided, which is preferably of aluminum and is of thin section for lightness. At one end it is provided with an opening for the connector 48 and an air inlet mouth 52, and the other end is formed with a plurality of spaced tongues 53 which abut the clamp ring 22, the spaces 54 between the tongues providing air outlet openings.

It is to be noted that the stator assembly comprising laminations 10, end rings 12 and 13, and bars 14, are supported entirely from one end, independently of the casing 51, upon the main support member 18. The stator assembly, in effect, provides its own supporting structure or frame, and the tight and rigid association of these parts due to the contraction of the ends of the bars 14 after the heating incident to the welding of the bars to the end rings 12 and 13 contributes to this arrangement. The end bell 24 is supported upon the end ring 13, which is in turn supported through the laminations 10, the bars 14 and the end ring 12 upon the main support member 18. The right-hand hub 35 of the rotor and the splined end of the drive shaft 43 are carried through the bearing 38 upon the end bell 24. The casing 51 rests upon the bars 14 and upon the portion 13b of the end ring 13 and the end bell 24. It provides no support and so can be thin and light in weight. All parts are carried through the main support member 18 through the stator assembly.

As previously stated and as shown in Figs. 3 and 5, the bars 14 are of T-shape in cross section. The cross or wide portion of the T fits in the slots 15 in the laminations and so contributes to the rigidity of the stator assembly, making it possible for the stator assembly to provide support for itself and for the parts at the right-hand end of the machine. The wide portions of the T-bars 14 make possible rigidity of assembly without welding of the bars to the laminations 10. This reduction of electrical efficiency due to welding at this region is avoided. The narrow portions or legs of the T-bars support the casing 51 and provide between themselves a maximum width for spaces 37 between the casing 51 and the laminations 10 for a cooling stream of air.

As previously stated, the flange 12b of ring 12 and portions 13b of ring 13 extend radially outwardly farther than, respectively, portions 12a and 13a. Portions 13b extend radially outwardly as far as the T-bars 14 extend so that the casing 51 is supported on the T-bars 14 and the portions 13b. The flange 12b extends radially outwardly so that the clamping ring 22 may engage it and may in turn extend radially outwardly about as far as the casing 51. As is evident from Fig. 1, the casing 51 abuts the clamping ring 22.

The machine is intended to be operated at speeds of rotation in the order of 5,000 R. P. M. and annular dished ring members 55 are secured to the rotor stack 29 by screws 56 for retaining the windings in place and to facilitate smooth air flow through the rotor.

The direction of the spiral of the air impeller blades 50 is such that rotation of the rotor assists air to flow through the interior of the rotor. Cooling air under pressure enters through the mouth 52 where it flows in two directions. One stream of air passes through the openings 34 at the inlet end thence out the openings 34 in the end ring 32 and out through the openings 21. This stream of air is forced by the shape of the impeller 49 to flow in close proximity to the under surface of the rotor iron where by virtue of its high velocity the heated layer of surface air is continually stripped away. The other stream flows outwardly through the openings 26 and into the spaces 57 between the stator stack and the housing 51, thence out through the openings 54. This latter stream of air is thus confined closely to the outer surface of the stack of laminations 10, where its high velocity can most effectively strip away the surface layer of heated air. The use of a relatively shallow layer of high velocity air has been found to be essential to the realization of "least weight per kilowatt". For maximum generator capacity, high velocity air is obtained from either an external blower or from a 2" ID tube whose intake end is exposed in the frontal area of an airplane. A pressure of 10" of water and a quantity of 100 cubic feet per minute are representative values. Without such a supply of air from an external source, the generator capacity is of course reduced, but even under these conditions (with the mouth 52 open to the atmosphere) the impeller 49 induces a relatively high velocity flow through the machine and cooling is improved thereby.

Although but one embodiment of the invention is herein shown and described, it will be understood that various changes in the size, shape and arrangement of parts may be made without departing from the spirit of our invention and it is not our intention to limit said invention other than by the terms of the appended claims.

We claim:

1. A rotor for a dynamo-electric machine comprising a stack of slotted laminations; a pair of end rings having flat annular portions disposed in abutment with said stack and cylindrical portions adapted to mount bearing races; said stack having a central axial bore; an air impeller disposed in said bore and secured to said end rings, and ventilating openings in the annular portions of said end rings.

2. In a dynamo-electric machine, a stator structure comprising a stack of laminations and a pair of end rings rigidly secured together; a rotor mounted in said stator structure; a mounting flange having means for securement to a support; a shouldered flange on said mounting flange; a flange on one of said end rings adapted to abut said shouldered flange; a channel-shaped ring adapted to receive both of said flanges, and means for tightening said ring thereby to detachably secure said stator to said mounting flange.

3. A dynamo-electric machine comprising a stator structure formed of a stack of laminations and a pair of end rings positioned at opposite ends of the stack of laminations, one of the end rings having a flange; a rotor mounted in the stator structure; a support having a flange; and means detachably securing the stator structure to the support and including a channel-shaped ring receiving the flange on the one end ring and the flange on the support.

4. A dynamo-electric machine including a stack of laminations having a plurality of spaced peripheral grooves extending longitudinally of the stack, a pair of end rings abutting opposite ends of the stack of the laminations, bars disposed in the slots in the stack of laminations, means rigidly securing the ends of the bars to the end rings, a casing enclosing the stack of laminations, and means connected with one end ring and supporting the stack of laminations through the bars and the end rings entirely independently of the casing.

5. A dynamo-electric machine including a stack of laminations, a pair of end rings abutting opposite ends of the stack, a plurality of bars extending longitudinally of the stack of laminations at the periphery thereof, means rigidly securing the ends of the bars to the rings, a casing surrounding the stack of laminations, and means connected with one end ring and supporting the stack of laminations through the bars and the end rings entirely independently of the casing.

6. A dynamo-electric machine including a stator, comprising a stack of laminations formed with aligned radial circumferentially spaced grooves, end rings having first portions engaging the end laminations and lying inward of the grooves and second portions spaced from the stack and projecting radially outwardly farther than the first portions and the stack, bars laid in the grooves and overlying the first portions of the end rings and extending radially outwardly as far as the second portions of the rings, and a casing surrounding the stator, end rings, and bars and engaging the bars and second portions of the end rings to provide air passages extending longitudinally of the stator.

7. A dynamo-electric machine including a stack of laminations having a plurality of spaced peripheral grooves extending longitudinally of the stack, a pair of end rings abutting opposite ends of the stack of laminations, a casing surrounding the stack of laminations in spaced relation thereto, bars joined by their ends to the end rings and having wide portions and narrow portions, the wide portions being disposed in the slots in the stack of laminations so as to serve with the end rings to support the stack independently of the casing, and the narrow portions projecting from the stack of laminations into contact with the casing so as to maintain the spaced relation between the casing and the stack of laminations and providing a maximum of spacing between bars for circulation of cooling air between the casing and the laminations.

8. A stator assembly comprising a stack of laminations, a pair of end rings abutting opposite ends of the stack, a plurality of bars extending longitudinally of the stack of laminations at the periphery thereof, means rigidly securing the ends of the bars to the rings, and a supporting means connected with one end ring for enabling the stator assembly to be supported through the bars and the end rings entirely at the end of the stator assembly where the one end ring is located.

9. A stator assembly comprising a stack of laminations, a pair of end rings abutting opposite ends of the stack, a plurality of bars extending longitudinally of the stack of laminations at the periphery thereof, means rigidly securing the ends of the bars to the rings, a casing surrounding the stack of laminations, and a supporting means connected with one end ring for enabling the stator assembly to be supported through the bars and the end rings entirely independently of the casing entirely at the end of the stator assembly where the one end ring is located.

10. A stator assembly comprising a stack of laminations, a pair of end rings abutting opposite ends of the stack, a plurality of bars extending longitudinally of the stack of laminations at the periphery thereof without being metallically bonded to the laminations, means rigidly securing the ends of the bars to the rings by metallic bonds, and a supporting means connected with one end ring for enabling the stator assembly to be supported through the bars and the end rings entirely at the end of the stator assembly where the one end ring is located.

11. A dynamo-electric machine including a stack of laminations having a plurality of spaced peripheral grooves extending longitudinally of the stack, a pair of end rings abutting opposite ends of the stack of the laminations, bars disposed in the slots in the stack of laminations without being metallically bonded to the laminations, means rigidly securing the end rings to the ends of the bars by metallic bonds, and a supporting means connected with one end ring for enabling the stator assembly to be supported through the bars and the end rings entirely at the end of the stator assembly where the one end ring is located.

12. A dynamo-electric machine including a stack of laminations having a plurality of spaced peripheral grooves extending longitudinally of the stack, a pair of end rings abutting opposite ends of the stack of the laminations, bars disposed in the slots in the stack of laminations without being metallically bonded to the laminations, means rigidly securing the end rings to the ends of the bars by metallic bonds, a casing surrounding the stack of laminations, and a supporting means connected with one end ring for enabling the stator assembly to be supported through the bars and the end rings entirely independently of the casing and entirely at the end of the stator assembly where the one end ring is located.

13. A stator assembly comprising a stack of laminations formed with aligned circumferentially spaced grooves, end rings having first portions engaging the end laminations and lying inward of the grooves and second portions spaced from the stack and projecting radially outwardly farther than the first portions and the stack, bars laid in the grooves and overlying the first portions of the end rings and extending radially outwardly as far as the second portion of one end ring, means rigidly securing the end rings to the bars, a casing surrounding the stack of laminations, the end rings, and bars in spaced relation to the laminations and the first portions of the end rings and in engagement with the bars and the second portion of the said one end ring, and supporting means connected with the second portion of the other end ring for enabling the stator assembly to be supported through the bars and the end rings entirely independently of the casing and entirely at the end of the stator assembly where the said other end ring is located.

14. A stator assembly comprising a stack of laminations formed with aligned circumferentially spaced grooves, end rings having first portions engaging the end laminations and lying inward of the grooves and second portions spaced from the stack and projecting radially outwardly farther than the first portions and the stack, bars laid in the grooves and overlying the first portions of the end rings and extending radially outwardly as far as the second portion of one end ring, means rigidly securing the end rings to the bars, a casing surrounding the stack of laminations, the end rings, and bars in spaced relation to the laminations and the first portions of the end rings and in engagement with the bars and the second portion of the said one end ring, the second portion of the other end ring being formed as a flange, a support member having a flange abutting the flange on the said other end ring, and a channel-shaped ring gripping the flanges for enabling the stator assembly to be supported entirely through the support member and independently of the casing.

15. The stator assembly specified in claim 14, the casing abutting the channel-shaped ring and having openings adjacent the channel-shaped ring for admitting cooling air to the spaces between the casing and the stack of laminations.

16. A dynamo-electric machine comprising a stationary stack of laminations, a pair of end rings abutting opposite ends of the stack, a plurality of bars extending longitudinally of the stack of laminations at the periphery thereof, means rigidly securing the ends of the bars to the rings, a rotor positioned within the stack of laminations, supporting and journalling means for one end of the rotor carried by the end ring adjacent the said one end of the rotor, a support connected with the other end ring for enabling the stationary stack of laminations, bars, end rings, and the said one end of the rotor to be carried through the bars and the end rings entirely at the end where the support is located, and means journalling and supporting the other end of the rotor on the support.

17. A dynamo-electric machine comprising a stationary stack of laminations, a pair of end rings abutting opposite ends of the stack, a plurality of bars extending longitudinally of the stack of laminations at the periphery thereof, means rigidly securing the ends of the bars to the rings, one end ring having a first portion abutting the stack of laminations and a second portion spaced from the first portion, a rotor positioned within the stack of laminations, bearing means for one end of the rotor carried by the second portion of the said one end ring, brush means for the rotor positioned between the first and second portions of the said one end ring, a support connected with the other end ring for enabling the stationary stack of laminations, bars, end rings, and the said one end of the rotor to be carried through the bars and the end rings entirely at the end where the support is located, and means journalling and supporting the other end of the rotor on the support.

18. A dynamo-electric machine including a stack of laminations having a plurality of spaced peripheral grooves extending longitudinally of the stack, a pair of end rings abutting opposite ends of the stack of the laminations, bars disposed in the slots in the stack of laminations, means rigidly securing the ends of the bars to the end rings, one end ring having a first portion abutting the stack of laminations and a second portion spaced from the first portion, an end bell carried by the second portion of the said one end ring, a rotor positioned within the stationary stack of laminations, means journalling one end of the rotor in the bell, brush means for the rotor positioned between the first and second portions of the said one end ring, the other end ring having a flange, a support having a flange, and a channel-shaped ring gripping the flanges for enabling the machine to be supported entirely at the end where the support is located.

VERNON W. SHERMAN.
EUGENE GONYOU.